United States Patent
Kinugawa et al.

(10) Patent No.: US 6,789,335 B1
(45) Date of Patent: Sep. 14, 2004

(54) SHOVEL

(75) Inventors: Hideki Kinugawa, Hiroshima (JP);
Masayuki Komiyama, Hiroshima (JP);
Hirokazu Araya, Kobe (JP); Masayuki Kagoshima, Kobe (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 0 days.

(21) Appl. No.: 09/700,729

(22) PCT Filed: Mar. 31, 2000

(86) PCT No.: PCT/JP00/02060
§ 371 (c)(1),
(2), (4) Date: Nov. 30, 2000

(87) PCT Pub. No.: WO00/58569
PCT Pub. Date: Oct. 5, 2000

(30) Foreign Application Priority Data

Mar. 31, 1999 (JP) .......................................... 11-093178

(51) Int. Cl.⁷ .............................. E02F 9/08; F16D 31/02
(52) U.S. Cl. .............................. 37/348; 37/443; 701/50
(58) Field of Search .......................... 37/347, 348, 443, 37/466, 905; 414/685, 686, 687, 917, 918, 718, 728; 180/9.1, 234, 167; 701/50; 60/400, 420

(56) References Cited

U.S. PATENT DOCUMENTS

| | | | | |
|---|---|---|---|---|
| 4,193,733 A | * | 3/1980 | Ullmann | 414/694 |
| 4,746,264 A | * | 5/1988 | Kishi et al. | 414/687 |
| 5,913,811 A | * | 6/1999 | Kinugawa et al. | 60/420 |
| 5,957,989 A | * | 9/1999 | Egawa et al. | 701/50 |
| 5,991,677 A | * | 11/1999 | Kinugawa et al. | 701/50 |
| 6,199,307 B1 | * | 3/2001 | Kagoshima et al. | 37/443 |

FOREIGN PATENT DOCUMENTS

JP          63 300131          12/1988

* cited by examiner

Primary Examiner—Robert E Pezzuto
(74) Attorney, Agent, or Firm—Oblon, Spivak, McClelland, Maier & Neustadt, P.C.

(57) ABSTRACT

An excavator in which a generator is driven by an engine as a power source. Electric motors are driven by electric power supplied from the generator, and a lower traveling body, an upper turning body, and operating parts of an excavation attachment are operated by the electric motors.

13 Claims, 5 Drawing Sheets

F I G. 2
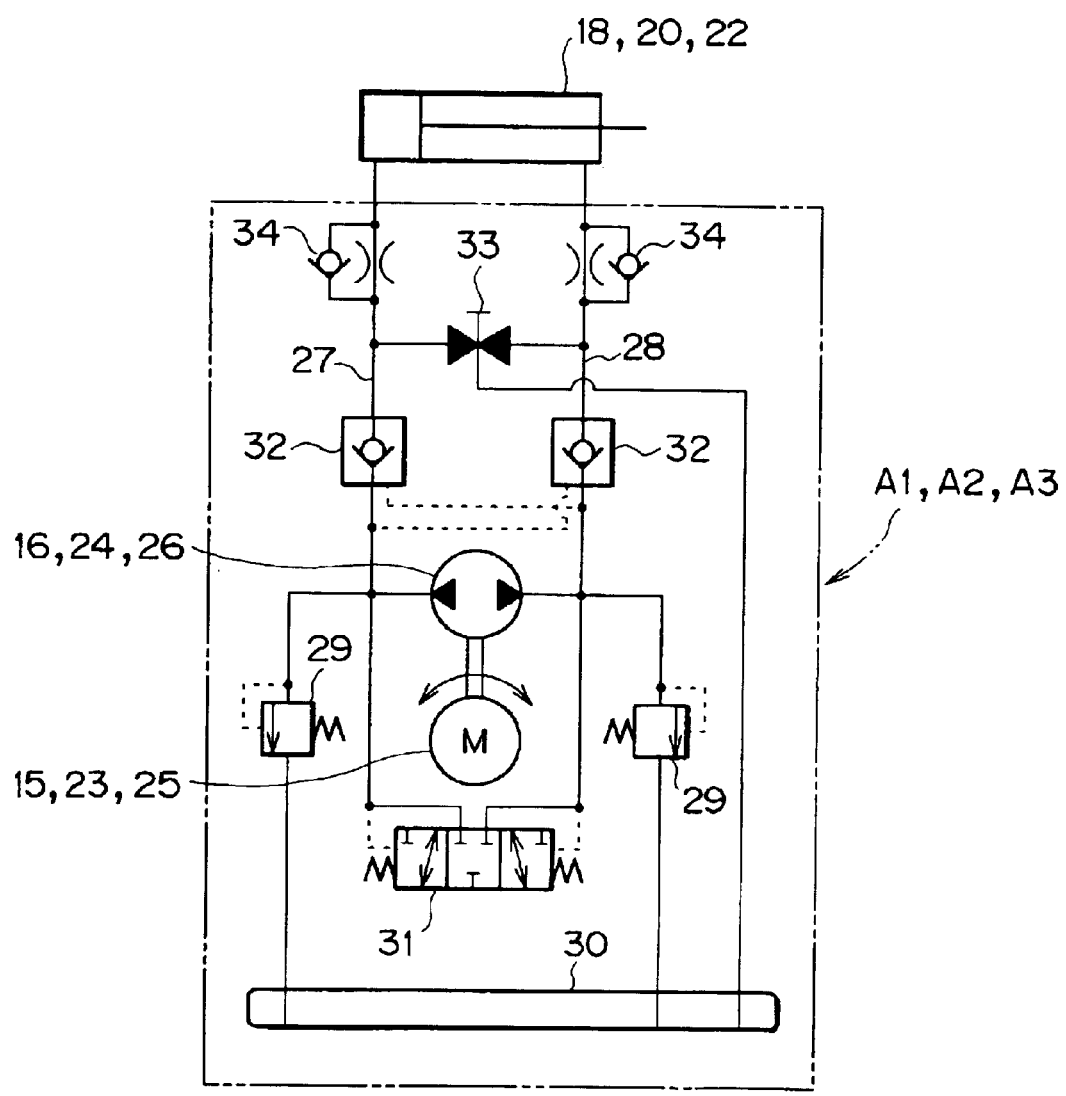

SHOVEL

BACKGROUND OF THE INVENTION

1. Field of the Invention

The present invention relates to an excavator as an excavation machine using an electric motor as a driving source.

2. Discussion of the Background

In the past, a general excavator called a hydraulic excavator is constituted so that an upper turning body is mounted on a lower traveling body (normally, a crawler), and an excavation attachment provided with a boom, an arm and a bucket is mounted on the upper turning body, whereby a hydraulic pump is rotated by an engine, as a driving source, installed on the upper turning body to supply its discharge oil to a hydraulic actuator (a hydraulic motor or a hydraulic cylinder) to effect traveling, turning, boom rising and falling, arm operation, and bucket operation.

However, the aforementioned conventional hydraulic type excavator has a problem that a burden applied to the engine is great, fuel cost is high, and exhaust gases and noises are involved.

In view of the above, there has been proposed a so-called hybrid type in which an electric motor is rotated by an engine, and a hydraulic pump is driven by the electric motor, as disclosed in Japanese Utility Model Application Laid-Open No. Hei 5 (1993)-4850 Publication.

The above-described well known hybrid type excavator is designed so that when the pump load is light, the electric motor is allowed to function as a generator by surplus torque of the engine (regenerative function) to store power in a battery, whereas at the time of heavy load, the engine is assisted by the stored power of the battery, thus smoothing the engine load, reducing the exhaust gases an reducing the fuel cost.

However, according to the above-described well known hybrid type excavator, since the turning force is transmitted through a channel of the engine—electric motor—hydraulic pump, it is necessary to mechanically connect these three elements, and collecting the latter at one place as a single power unit and installing them.

This poses the following disadvantages:

(1) The power unit is large, and a large space is required for the installing part (upper turning body), these points impede the arrangement of devices, which is unsuitable for a small turning type excavator which recently becoming the main current.

(2) The variation of load of the excavator is particularly sever in terms of time and level as compared with an automobile or the like so that switching of the mechanical connecting parts of the power unit is frequently carried out, thus posing a great problem in terms of responsiveness and durability of the power unit.

(3) As a problem in terms of oil pressure, the following occur:

(a) The distance between the hydraulic pump of the power unit and the hydraulic actuator installed at each operating part of the excavator is so long that pressure loss is great;

(b) Energy loss particularly at the time of fine operation is great due to the bleed off from a control valve (a switching valve) provided between the pump and the actuator; and (c) A pilot hydraulic source (a pump) for the pilot control of the control valve is also necessary.

As described, the energy loss of the hydraulic system is large, and the actual effect of improving fuel cost is low.

SUMMARY OF THE INVENTION

Thus, the present invention provides an excavator in which a power unit can be installed by being divided and scattered at a small unit, frequent switching of the mechanical connecting parts of the power unit is not required, and the energy efficiency of the engine can be improved.

For solving the aforesaid problem, the present invention employed the following constitution.

That is, an excavator in which an upper turning body is mounted on a lower traveling body, and an excavation attachment is provided on the upper turning body, comprising an engine as a power source, a generator driven by the engine, and a plurality of electric motors rotated by electric power supplied from the generator, whereby the electric motors as a driving source operate the lower traveling body, the upper turning body and each operating part of the excavation attachment.

BRIEF DESCRIPTION OF THE DRAWINGS

FIG. 2 is a circuit representation of an electric motor and a pump integrated type actuator used for the excavator.

DESCRIPTION OF THE PREFERRED EMBODIMENTS

Figure 1:
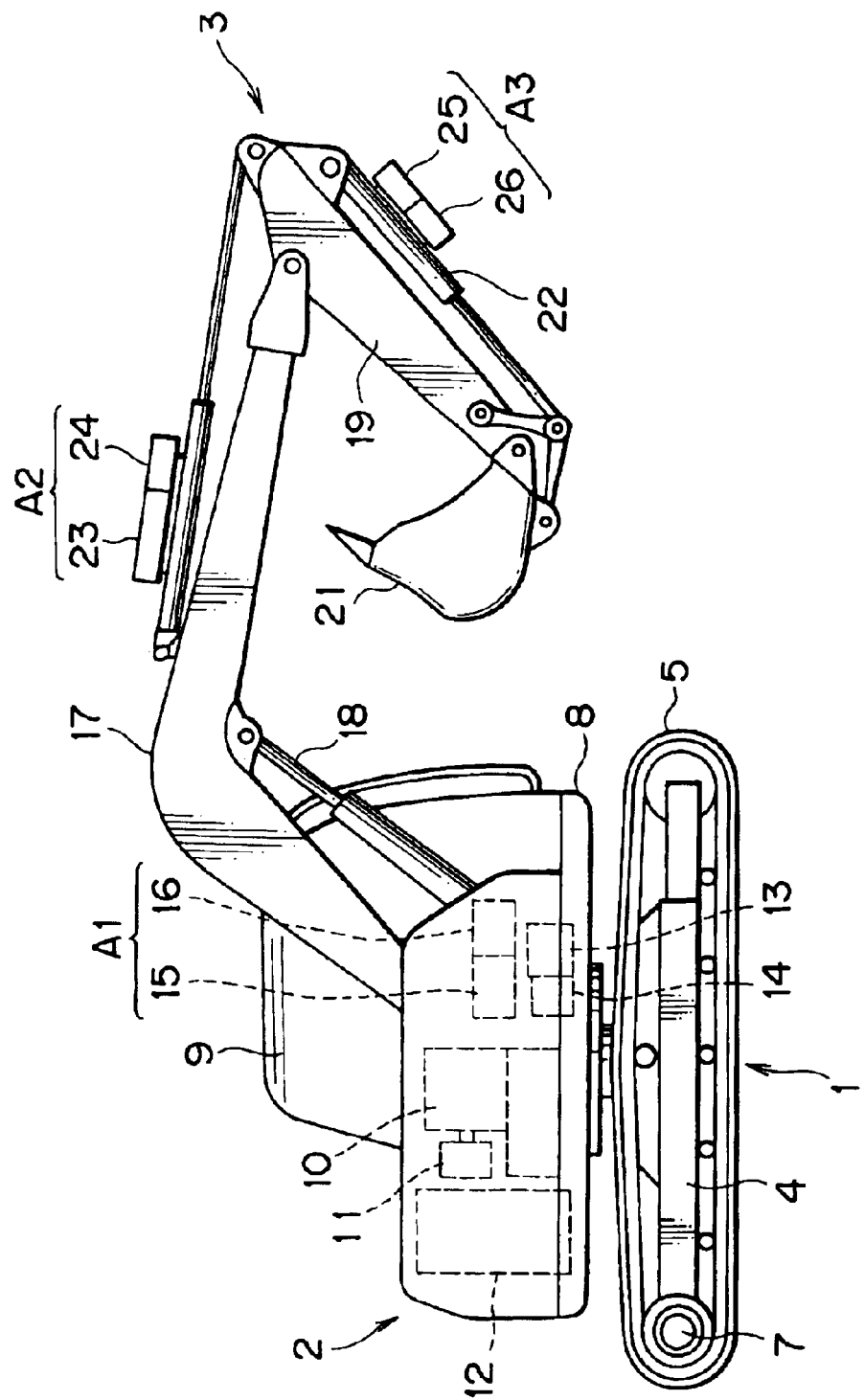
FIG. 1 is an entire schematic side view of an excavator according to a first embodiment of the present invention.
Figure 3:
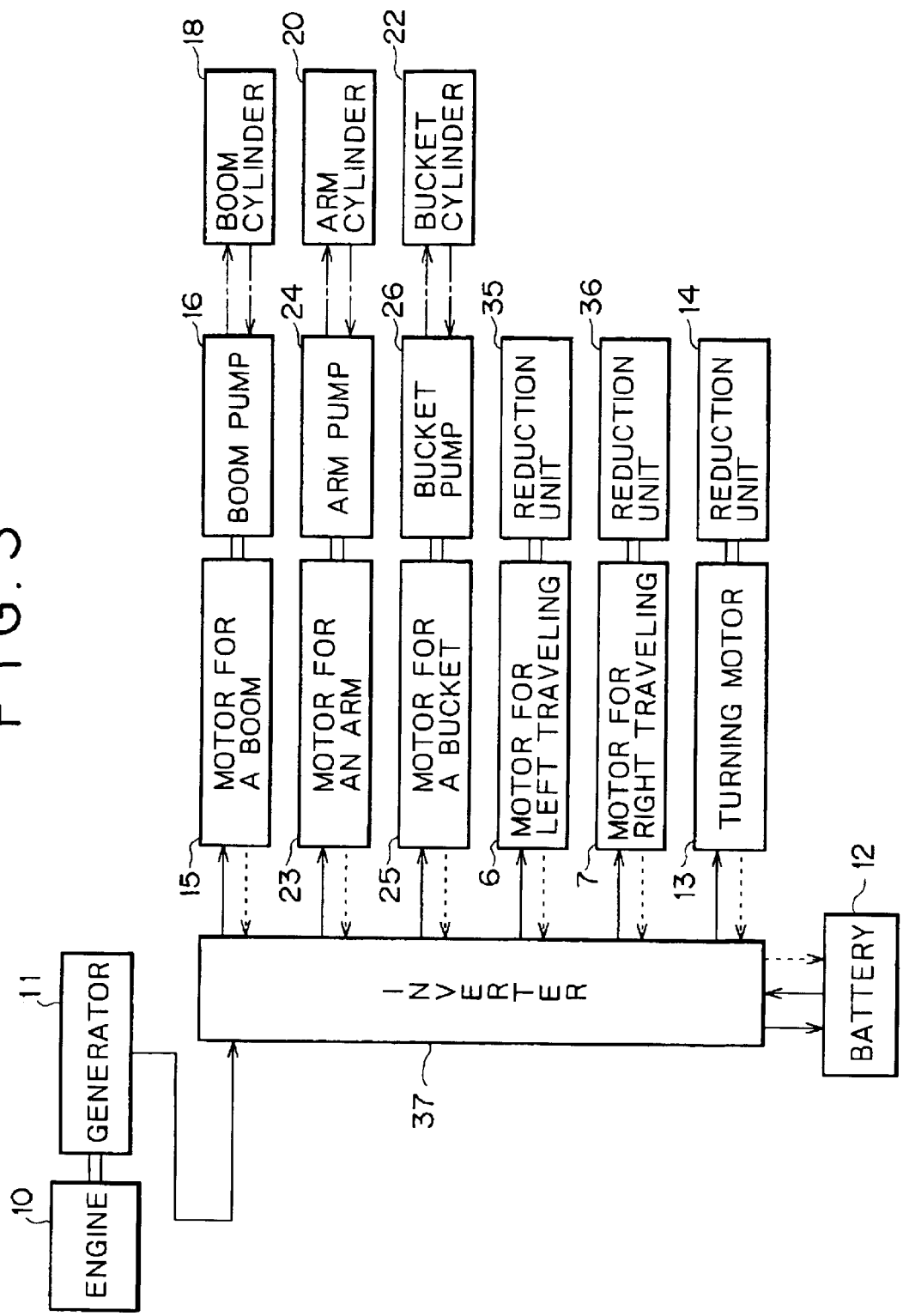
FIG. 3 is a block constitutional view of a driving and control system of the excavator.

First Embodiment (see FIGS. 1 to 3)

FIG. 1 shows an entire excavator according to this embodiment.

In the figure, reference numeral 1 denotes a lower travel body; 2 an upper turning body; and 3 an excavation attachment mounted on the front part of the upper turning body 2.

The lower travel body 1 comprises left and right crawler frames 4 and crawlers (in both of which, only one side is shown) 5, and both the crawlers 5 travel by being individually rotated and driven by left and right electric motors for traveling (see FIG. 3) 6 and 7.

The upper turning body 2 comprises a turning frame 8, a cabin 9 and so on. On the turning frame 8 are installed an engine 10 as a power source, a generator 11 driven by the engine 10, a battery 12 an electric motor for turning 13, a reduction unit 14 for reducing a turning force of the electric motor for turning 13 to transmit it to a turning mechanism (a turning gear), an electric motor for a boom 15, and a hydraulic pump for a boom (hereinafter referred to as boom pump) 16 rotated and driven by the electric motor for a boom 15.

The excavation attachment 3 comprises a boom 17, a boom cylinder 18 expanded and contracted the boom 17 by pressure oil from the boom pump 16, an arm 19, an arm cylinder 20 for turning the arm 18, a bucket 21, and a bucket cylinder 22 for operating the bucket 21.

In the excavation attachment 3, an electric motor 23 for an arm and a hydraulic pump for an arm (hereinafter referred to as an arm pump) 24 driven thereby, and an electric motor for a bucket 25 and a hydraulic pump for a bucket driven thereby (hereinafter referred to as a bucket pump) 26 are provided on the arm cylinder 20, and the bucket cylinder 22, respectively.

Units of the electric motor for a boom 15 and the boom pump 16, of the electric motor for an arm 23 and the arm pump 24, and of the electric motor for a bucket 25 and the bucket pump 26 are constituted as well known integrated type actuators A1, A2 and A3, respectively.

The constitution of the integrated type actuators A1, A2 and A3 is shown in FIG. 2.

As shown in the figure, the pumps 16, 24 and 26 are respectively constituted as bi-directional pumps in which an oil discharging direction is converted according to a turning direction of the electric motors 15, 23 and 25, and both discharge ports of the pumps 16, 24 and 26 are connected to oil chambers on the head side and the rod side of the cylinders 18, 20 and 22 through pipes 27 and 28.

In FIG. 2 reference numerals 29, 29 denote a relief valve; 30 an oil tank; 31 automatic switching valves provided between the pump 16, 24, 26 and the oil tank 30; 32, 32 operate check valves; 33 manual open-close valves provided between both the pipes 27 and 28; and 34, 34 slow return valves.

By employing the integrated actuator constitution, the entire unit can be miniaturized and light-weighted as compared with the case where the electric motor and the pump are separately provided. Therefore, it is advantageously mounted on the excavation attachment 3.

FIG. 3 shows the block constitution of a driving system and a control system of the excavator.

In the figure, the solid line, the dotted line, and the phantom outline indicate an electric driving system, an electric circuit, and a hydraulic driving system, respectively. In the figure, reference numeral 35, 36 denote reduction units for left and right electric motors for traveling 6, 7.

An inverter 37 is provided between the generator 11, each of the electric motors 6, 7, 15, 23, 25 and a battery 12. By the inverter 37, (1) AC power prepared by the generator 11 is converted into DC for storage in the battery 12 (normal charging operation), (2) AC power generated in the electric motors 6, 7, 15, 23 and 25 is converted into DC by regenerative operation resulting from the excavator operation for storage in the battery 12 (regenerative charging operation), and (3) Stored power in the battery 12 is converted into AC and supplied to the electric motors 6, 7, 15, 23 and 25 (discharging operation).

The inverter 37 is provided with a switching means not shown whereby the charging and discharging operations are switched by operation of an operator or according to the load condition.

The electric motors 6, 7, 15, 23 and 25 are controlled in turning speed and turning direction by, for example, an operating means of a lever operating type not shown which is operated by an operator.

The driving and control operations for the excavator including the above-described operations (1) to (3) will be described hereinafter.

When the engine 10 is operated, the generator 11 is driven to carry out generating operation, and the electric motors 6, 7, 15, 23 and 25 are driven by AC power generated.

Thereby, power is transmitted to the excavation attachment 3 through a driving channel of the electric motors 15, 23, 25—pumps 16, 24, 26—cylinders 18, 20, 22, and power is transmitted to the lower traveling body 1 and the upper turning body 2 through a driving circuit of the electric motors 6, 7, 13—reduction units 35, 36, 14 for operation (excavation, traveling, turning).

Basically, the electric motors 6, 7, 15, 23, 25 are driven by power supplied via the inverter 37 from the generator 11, but under heavy load, by operation of the switching means, short of power is compensated by the stored power of the battery 12, while under light load, surplus power of the generator 11 is stored in the battery 12.

During operation, the electric motors 6, 7, 15, 23, 25 are operated as a generator (regenerative operation) making use of position energy and kinetic energy thereof whereby the regenerative power generated can be stored in the battery 12. Particularly, the electric motors 15, 23, 25 provided on the excavation attachment 3 are so high in position energy and kinetic energy that the stored effect is high. It is therefore possible to reduce consuming energy and minimize the battery 12.

On the other hand, where the load is light, and the battery capacity is sufficient, output of the engine 10 is lowered, or the engine is stopped, and the electric motors 6, 7, 15, 23, 25 can be driven merely by battery power.

By such an operation, the engine load can be smoothed, the noise and exhaust gases can be reduced, and the fuel cost can be reduced.

According to this excavator, the turning force is transmitted through the channel of the engine 10—generator 11 . . . electric motors 6, 7, 15, 23, 25, as described above, the mechanical coupling being merely for the engine 10 and the generator 11. The power unit is divided into a set of engine 10+generator, and the electric motors 6, 7, 15, 23, 25, and the former can be installed on the upper turning body 2 while the latter can be installed on various operating parts (the lower traveling body 1, the upper traveling body 2, and the excavation attachment). Accordingly, since a large installation space collected at one place is not necessary, and this is suited, particularly, for a small turning type excavator.

Further, various operating parts are driven by the electric motors 6, 7, 15, 23, 25, and the generator 11 can be connected to the electric motors 6, 7, 15, 23, 25 by an electric wiring, thus enabling considerable reduction of transmission loss of energy.

Figure 4:
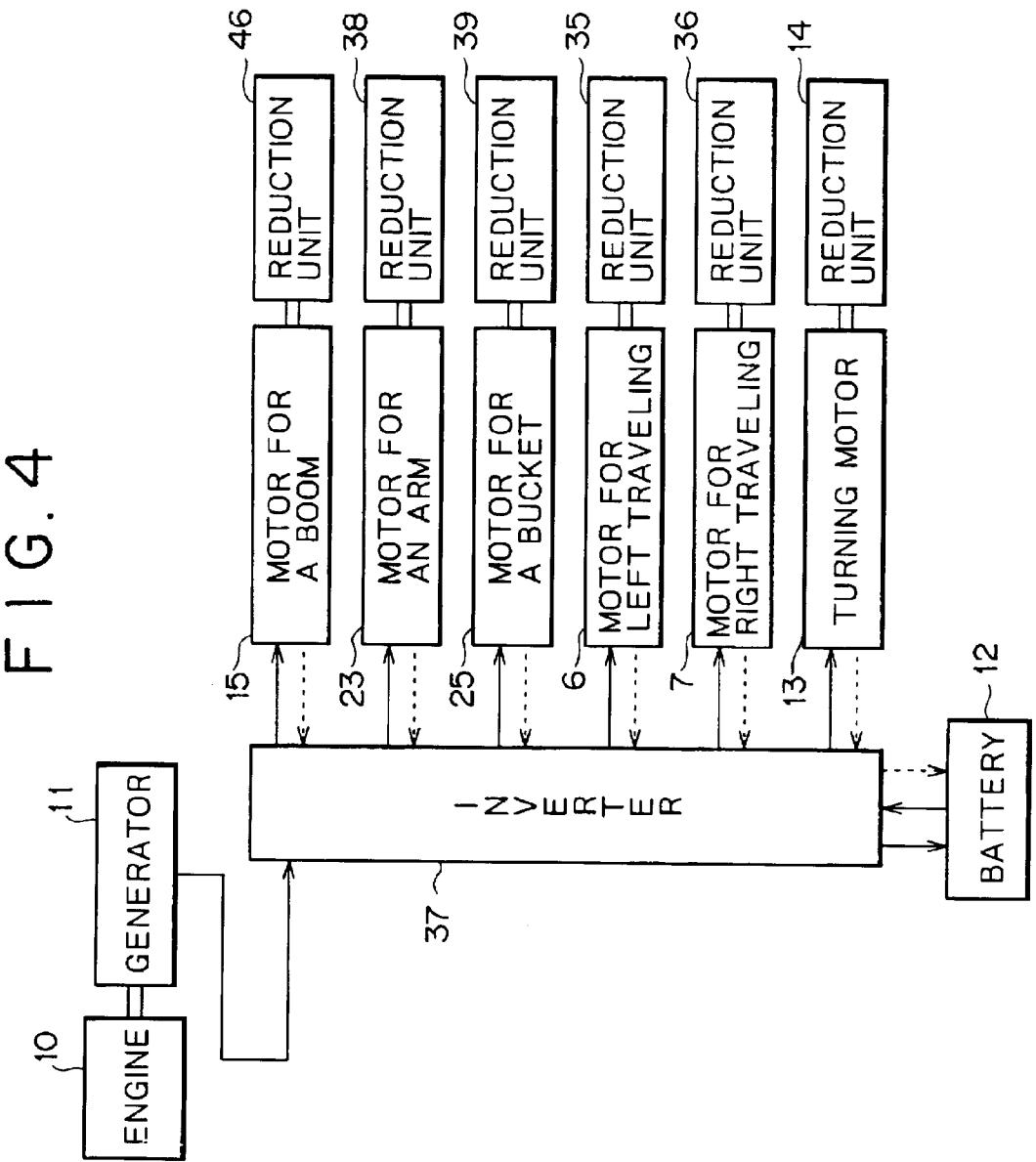
FIG. 4 is a view corresponding to FIG. 3 of an excavator according to a second embodiment of the present invention.

Second Embodiment (See FIG. 4)

Only the difference from the first embodiment will be described.

In the first embodiment, each operating part of the excavation attachment 3, i.e., the boom 17, the arm 19, and the bucket 21 are operated through the channel of the pumps 16, 24, 26—hydraulic cylinders 18, 20, 22, whereas in the second embodiment, the boom 17, the arm 19 and the bucket 21 are operated directly mechanically by the electric motors 15, 23, 25 and the reduction units 37, 38, 39.

In this case, there can be employed the constitution in which the reduction unit output side is connected to the diametrically central part during turning of the boom 17, the arm 19 and the bucket 21.

By doing so, no hydraulic system is necessary, and the efficiency of power transmission is improved.

Figure 5:
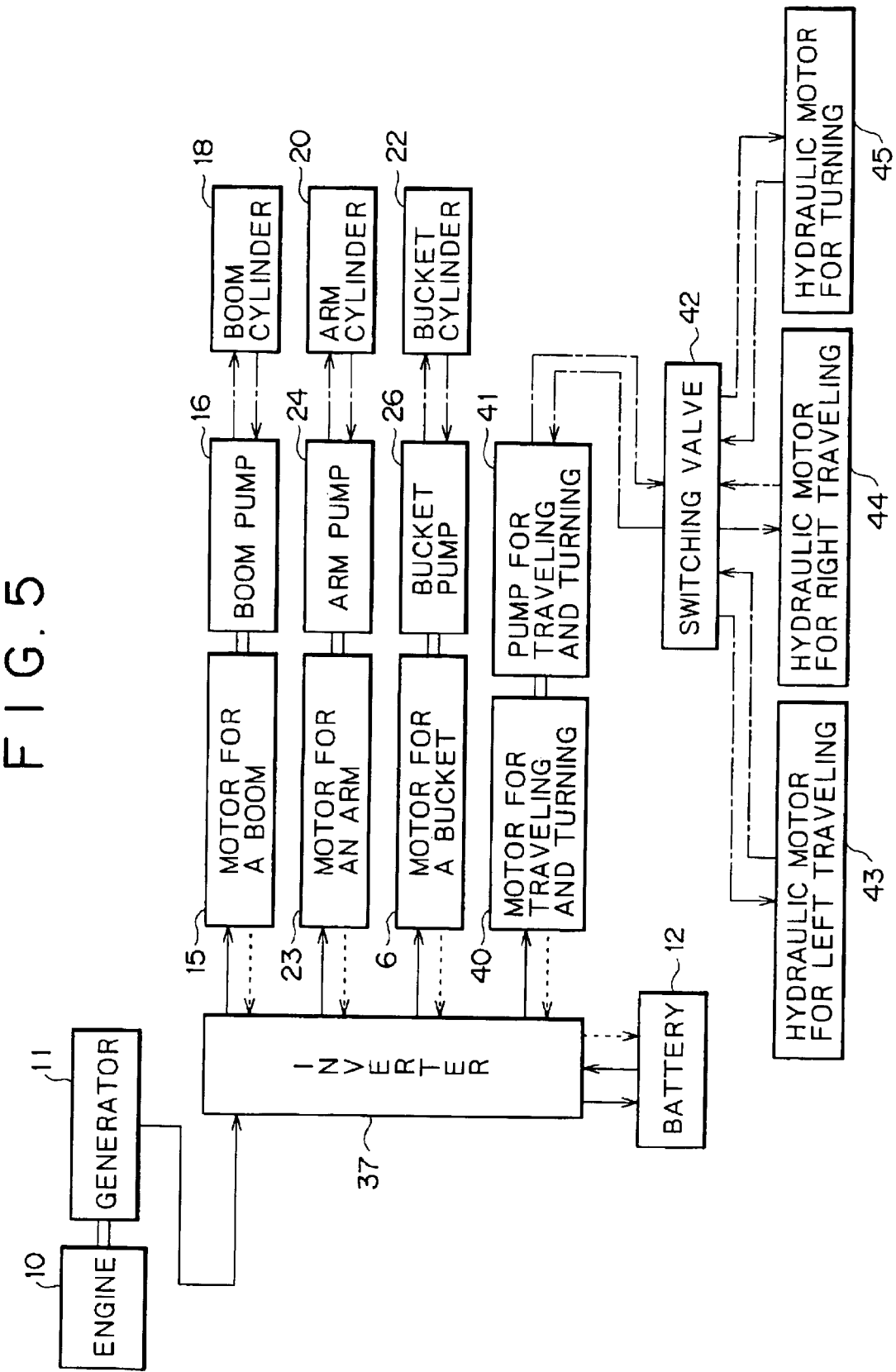
FIG. 5 is a view corresponding to FIG. 3 of an excavator according to a third embodiment of the present invention.

Third Embodiment (see FIG. 5)

In the actual operation, the "traveling" operation of the lower traveling body 1 and the "turning" operation of the upper turning body 2 are hardly carried out simultaneously.

The third embodiment has paid attention thereto to employ the constitution in which a traveling and turning electric motor 40 is used, so that a traveling and turning hydraulic pump 41 is driven by the electric motor 40, and pressure oil from the pump 41 can be supplied to left and right traveling hydraulic motors 43, 44 or a turning hydraulic motor 45 through a switching valve 42 to selectively perform the traveling and turning operation.

By doing so, two electric motors can be reduced, and the constitution of devices can be simplified.

While in the first embodiment, the integrated type actuators A1, A2, A3 in which the electric motors 15, 23, 25 for the boom, arm and bucket, and the pumps 16, 24, 26 driven thereby are integrated were used, it is noted that the electric motors 15, 23, 25 and the pumps 16, 24, 26 may be separately provided and connected mechanically.

Further, the present invention can be also applied to an excavator wherein in the excavation attachment 3, other working tools (for example, an earth removing plate and a crusher) are mounted in place of the bucket 21, an excavator which as the excavation attachment 3, is provided with a loading type for excavation from this side to the opposite side in place of a back hoe type for excavation toward this side as shown in FIG. 1, and an excavator which uses a wheel in place of a crawler as a lower traveling body.

As described above, the constitution is employed in which the generator is driven by the engine as a driving source, the electric motors are rotated by electric power supplied from the generator, and the lower traveling body and the upper turning body and the operating parts of the excavation attachment are operated by the electric motors, and therefore, only the engine and the generator will suffice for the mechanical connection.

That is, the power unit is divided into a set of engine+generator and electric motors, which can be installed separately (the former is the upper turning body, and the latter are the operating parts).

Therefore, a large installing space is not necessary at one place, and particularly, a small turning type excavator is suitably used.

Further, there is employed the constitution in which the operating parts are driven by the electric motors, and since the generator and the electric motors can be connected by the electric wiring, frequent switching of the mechanical connecting parts is not required, and the transmission loss of energy can be considerably reduced.

In this case, at the time of light load, electric power generated in the generator is stored in the battery while at the time of heavy load, a short of power of the generator is compensated for by the stored power of the battery, or is borne in place of the generator whereby the engine load of the excavator which is severe in variation of load can be smoothed to realize reduction in exhaust gases and reduction in fuel cost.

Further, by the provision of the constitution in which electric power generated by the regenerative control of the electric motors is stored in the battery, the stored effect is obtained, and particularly, the electric motors provided on the excavation attachment are high in stored effect because position energy and kinetic energy can be used for the regenerative operation.

Because of this, the consuming energy can be reduced, and the battery can be miniaturized.

Further, by the provision of the constitution in which as the hydraulic actuators for the operating parts, the traveling hydraulic motor and the turning hydraulic motor are provided on the lower traveling body and the upper turning body, respectively, and oil from oil pressure driven by a single electric motor is selectively supplied to one of the traveling hydraulic motor and the turning hydraulic motor through the switching valve, one electric motor can be used in common for the "traveling" and "turning" which are rarely operated simultaneously.

Because of this, two electric motors can be saved, thus enabling simplification of constitution of devices, and reduction in costs of devices.

Furthermore, in the constitution in which the driving force is transmitted through the channel of the electric motor—hydraulic pump—hydraulic actuator, as described above, the electric motor/pump integrated type actuator is used whereby miniaturization and light-weight construction can be realized as compared with the case where these elements are provided separately and independently. Therefore, this is particularly suitable for one installed on the excavation attachment.

On the other hand, by the provision of the constitution in which the turning force of the electric motor is reduced by the reduction unit to apply it as the driving force to the operating parts, whereby no hydraulic system is required to thereby improve the transmission efficiency of energy.

INDUSTRIAL APPLICABILITY

As described above, according to the present invention, the installing space for the unit can be reduced, and there can be obtained the useful effect which is advantageous particularly in the small turning type excavator.

What is claimed is:

1. An excavator in which an upper turning body is mounted on a lower traveling body, and an excavation attachment is provided on the upper turning body, comprising an engine as a power source, a generator driven by the engine, and a plurality of electric motors rotated by electric power supplied from the generator, wherein the electric motors as a driving source operate the lower traveling body, and the upper turning body and each operating part of the excavation attachment, wherein in the operating part provided with a hydraulic actuator, a hydraulic pump is driven by the electric motor, and said hydraulic actuator is operated by oil from said hydraulic pump.

2. The excavator according to claim 1, wherein surplus electric power from the generator is stored in a battery, and the electric motors are driven by the electric power stored in the battery as necessary.

3. The excavator according to claim 1, wherein as the hydraulic actuator in the operating part, a traveling hydraulic motor and a turning hydraulic motor are provided on the lower traveling body and the upper turning body, respectively, and oil from the hydraulic pump driven by one electric motor is selectively supplied to either said traveling hydraulic motor or said turning hydraulic motor.

4. The excavator according to claim 1, using an electric motor-pump integrated type actuator in which the electric motor and the hydraulic pump in which a discharging direction of oil is converted according to the turning direction of said electric motor.

5. The excavator according to claim 1, wherein turning force of the electric motor is reduced by a reduction unit to apply it as the driving force the operating part.

6. The excavator according to claim 2, wherein a turning force of the electric motor is reduced by a reduction unit to apply it as the driving force to the operating part.

7. An excavator in which an upper turning body is mounted on a lower traveling body, and an excavation attachment is provided on the upper turning body, comprising an engine as a power source, a generator driven by the engine, and a plurality of electric motors rotated by electric power supplied from the generator, wherein the electric motors as a driving source operate the lower traveling body, and the upper turning body and each operating part of the excavation attachment, wherein surplus electric power from the generator is stored in a battery, and the electric motors are driven by the electric power stored in the battery as necessary, and wherein electric power generated by regenerative control of the electric motors is stored in the battery.

8. The excavator according to claim 7 wherein a turning force of the electric motor is reduced by a reduction unit to apply it as the driving force to the operating part.

9. The excavator according to claim 7, wherein in the operating part provided with a hydraulic actuator, a hydraulic pump is driven by the electric motor, and said hydraulic actuator is operated by oil from said hydraulic pump.

10. The excavator according to claim 9, using an electric motor-pump integrated type actuator in which the electric motor and the hydraulic pump in which a discharging direction of oil is converted according to the turning direction of said electric motor.

11. The excavator according to claim 9, wherein as the hydraulic actuator in the operating part, a traveling hydraulic motor and a turning hydraulic motor are provided on the lower traveling body and the upper turning body, respectively, and oil from the hydraulic pump driven by one electric motor is selectively supplied to either said traveling hydraulic motor or said turning hydraulic motor.

12. The excavator according to claim 11, using an electric motor-pump integrated type actuator in which the electric motor and the hydraulic pump in which a discharging direction of oil is converted according to the turning direction of said electric motor.

13. An excavator in which an upper turning body is mounted on a lower traveling body, and an excavation attachment is provided on the upper turning body, comprising an engine as a power source, a generator driven by the engine, and a plurality of electric motors rotated by electric power supplied from the generator, wherein the electric motors as a driving source individually operate the lower traveling body, and the upper turning body and each operating part of the excavation attachment, wherein in the operating part provided with a hydraulic actuator, a hydraulic pump is driven by the electric motor, and said hydraulic actuator is operated by oil from said hydraulic pump.

* * * * *